UNITED STATES PATENT OFFICE.

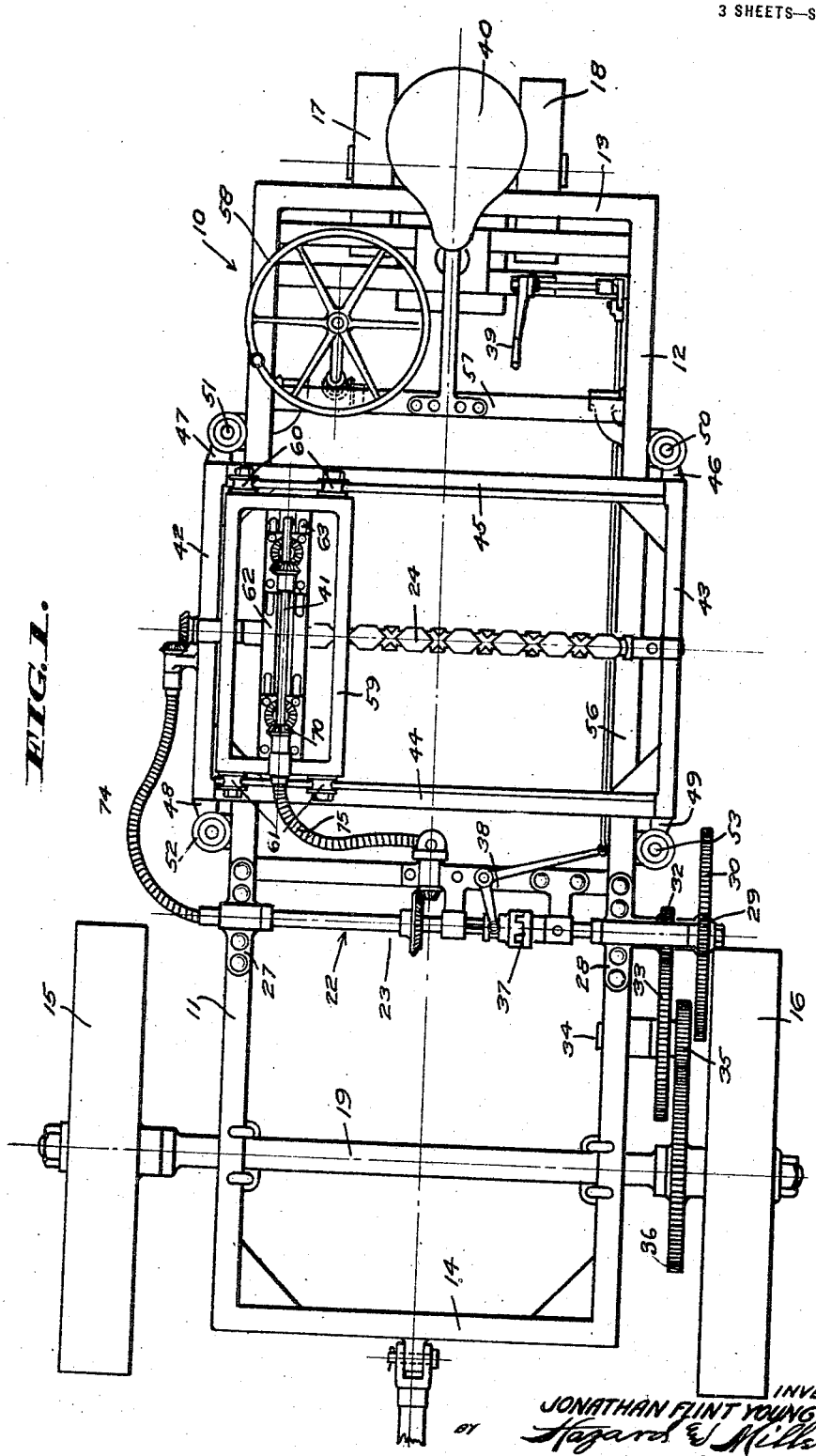

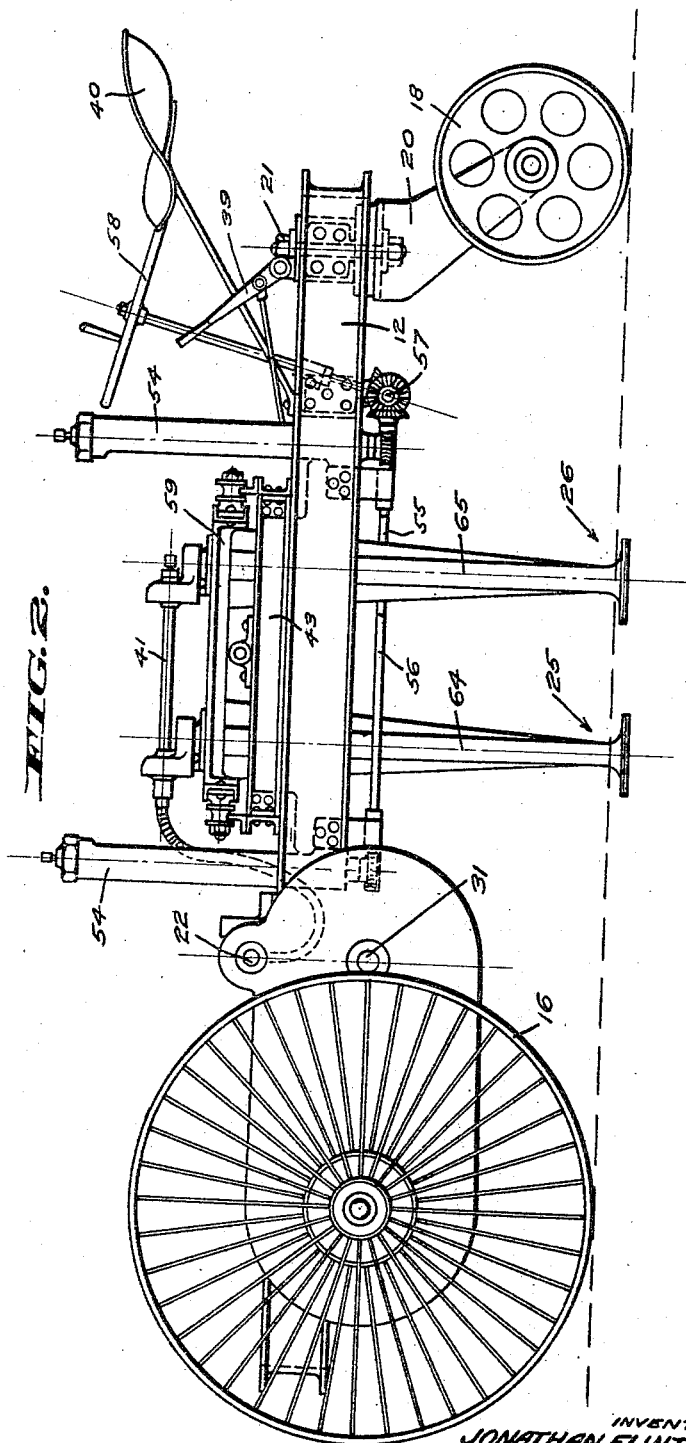

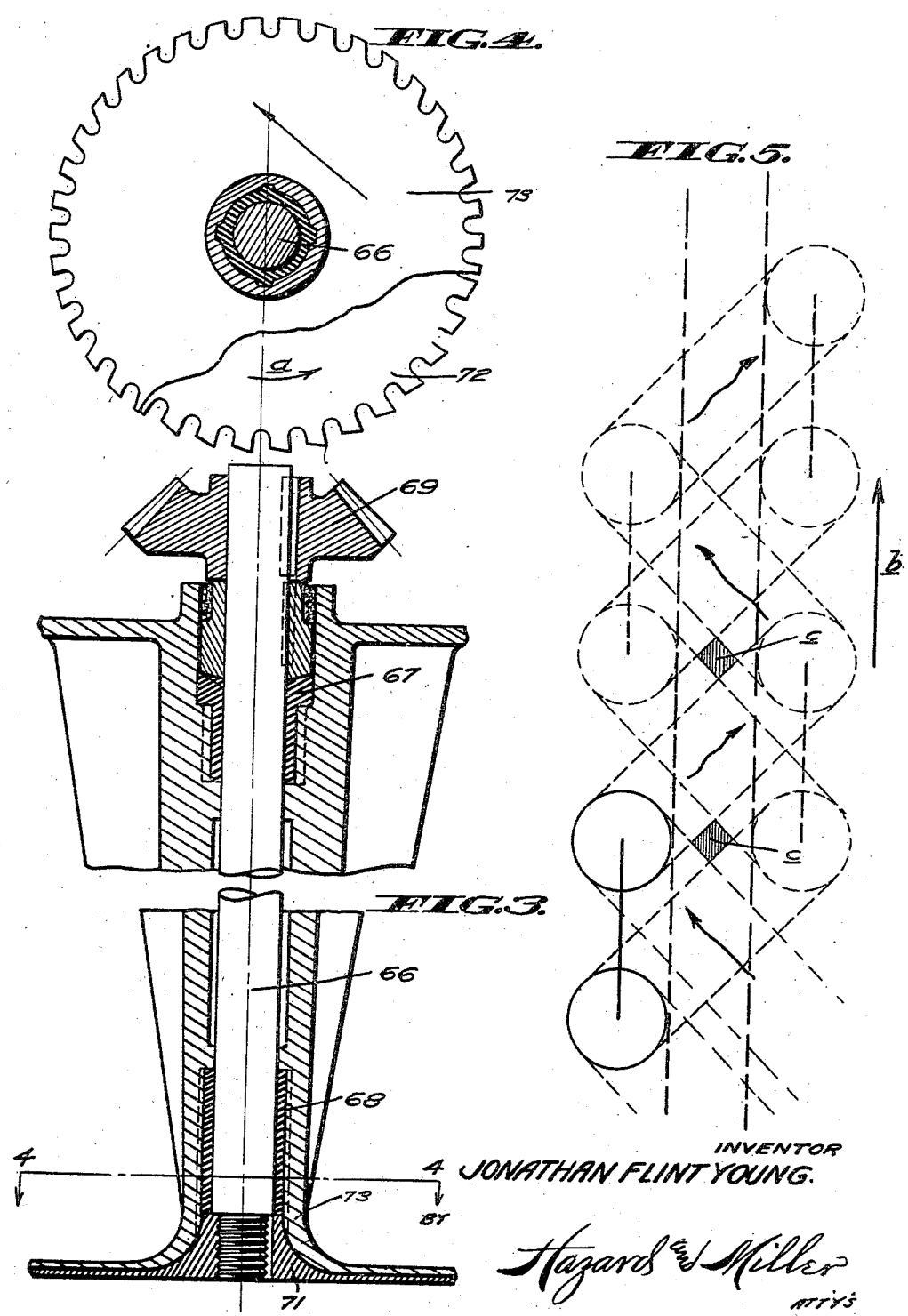

JONATHAN F. YOUNG, OF CLAREMONT, CALIFORNIA.

COTTON-CHOPPER.

1,235,512.  Specification of Letters Patent.  Patented July 31, 1917.

Application filed February 20, 1917. Serial No. 149,912.

*To all whom it may concern:*

Be it known that I, JONATHAN FLINT YOUNG, a citizen of the United States, residing at Claremont, in the county of Los Angeles and State of California, have invented new and useful Improvements in Cotton-Choppers, of which the following is a specification.

This invention relates to an agricultural implement and particularly pertains to a cotton chopper, beet chopper and the like.

In the cotton growing industry it is common practice to sow the cotton seeds in rows or strips approximately thirty-six to forty-four inches apart and to thereafter cut out a portion of the cotton plants after they have germinated and grown to proper size and age to be thinned or chopped. This cutting out process has previously been done by hand at considerable expense. It is the principal object of this invention to provide a mechanically operated apparatus which will thin out the cotton plants as desired and will leave a predetermined patch of cotton plants undisturbed.

Another object of this invention is to provide a mechanism for cutting the cotton or beets which will act in a positive manner along definite lines of travel and will sever the stalks of the cotton plants beneath the ground in a desirable manner and will act to clear weeds and grasses from the rows of cotton.

Another object of this invention is to provide a cutting mechanism which will act automatically as it advances along the rows of cotton or beets and when once adjusted for operation will not require the attention of the operator except to drive the vehicle upon which the apparatus is mounted.

Another object of this invention is to provide a device of the above class which may be readily adjusted to thin out the cotton or beets and leave patches of a given size and spaced given distances apart along the rows.

Another object of this invention is to provide a machine which requires the use of few cutter blades which may be readily interchanged or repaired and which are so mounted as to be vertically and horizontally adjustable.

It is a further object of this invention to provide a cotton or beet chopping mechanism which is composed of few parts simple in construction and easily operated and which do not require the use of outside agencies to produce their operation.

Other objects will appear hereinafter.

The invention is illustrated, by way of example, in the accompanying drawings in which:

Figure 1 is a view in plan illustrating the complete agricultural implement as set up for operation.

Fig. 2 is a view in side elevation illustrating the implement as shown in Fig. 1.

Fig. 3 is a view in transverse section and elevation as seen along one of the cutter bearings and particularly discloses the disposition of the rotatable cutter bearing in relation to the fixed bearing.

Fig. 4 is a view in section and elevation as seen on the line 4—4 of Fig. 3 with parts broken away to more clearly disclose the formation of the rotatable cutter teeth.

Fig. 5 is a view in diagram illustrating the manner in which the cutter blades operate to cut out portions of the cotton or beet plants and particularly discloses the various positions of the cutter blades as they advance along a row of plants in centrally crossing zig-zag paths.

Referring more particularly to the drawings, 10 indicates the main frame of the implement which is here shown as having side rails 11 and 12 and end members 13 and 14. These parts are combined to form a rectangular frame beneath which wheels 15 and 16 are disposed, as well as trailer wheels 17 and 18. The wheels 15 and 16 are rotatably mounted upon the opposite ends of an axle 19 which is suitably secured beneath the forward end of the frame. These wheels are of a large diameter and produce traction by which the operative mechanism of the implement is actuated. The rear wheels 17 and 18 are mounted upon a suitable caster bracket 20 which is pivoted by means of a pivot pin 21 beneath and to the rear end of the frame. These wheels are thus free to swing horizontally and will thus track the general movement of the front wheels, as will be understood. These four wheels and their mounting constitute the running gear of the vehicle and serve as a conveyance for a cutter mechanism 22.

The mechanism 22, broadly considered, consists of a stationary jack-shaft 23, a worm shaft 24, and longitudinally alined cutter units 25 and 26. The stationary jack-shaft 23 is mounted within bearings 27 and 28 which are secured to the side rails of the frame and hold the jack-shaft in rotatable relation thereto and across the frame. This shaft is fitted at one end with a pinion 29 which meshes with a gear 30 secured upon an auxiliary shaft 31 hung beneath the frame. The auxiliary shaft 31 is also fitted with a small gear 32 which meshes with an intermediate gear 33 mounted upon a stub-shaft 34. This stub-shaft also is fitted with a small gear 35 which in turn meshes with a driving gear 36 secured to rotate with the traction wheel 16. By the change in the gear ratios of this train of gears there will be a difference in the speed of rotation of the shaft 23 and the wheel 16, as will be understood, and by this means the angular path of travel described by the cutter units 25 and 26 will be partially determined. The shaft 23 is broken at a point along its length and a clutch 37 is interposed in order to render the gear train and driving mechanism inoperative when desired. This clutch is controlled by a bell-crank 38 which is operated by a hand-lever 39 positioned adjacent the seat 40 occupied by the driver. The jack-shaft 23 is provided as a drive for the fixed worm shaft 24 and a movable jack-shaft 41 by which the cutter units are directly actuated. The shaft 24 is positioned within bearings and extends transversely of the vehicle frame at a point approximately mid-way its length. The bearings of this shaft are mounted upon the ends of an enlargement of the frame and are secured directly to rails 42 and 43. These rails are provided as a supporting frame for track members 44 and 45 which extend parallel across the frame and are spaced upon opposite sides of the shaft 24 and equi-distant thereto.

The rectangular elevator frame, composed of the rails 42 and 43 and the track members 44 and 45, is provided with brackets 46, 47, 48 and 49 by which it may be vertically adjusted and supported. These brackets encompass a series of adjusting screws 50—53 inclusive. These screws are mounted within a series of housings 54 and are adapted to be simultaneously rotated by means of shafts 55 and 56 which extend along opposite sides of the frame and are fitted with worm gears which engage the lower ends of the screws. At the rear end of these shafts a cross-shaft 57 is provided and geared to these shafts and may be rotated by a hand-wheel 58. This allows the rectangular frame to be easily raised and lowered by the operator.

Supported upon the tracks 44 and 45 of the vertically movable elevator frame is a transversely reciprocating cutter carriage 59 which is rectangular in shape and is fitted at its opposite ends with pairs of flanged rollers 60 and 61. The carriage supports a pair of rails 62 and 63 which extend at right angles to the drive shaft 24 and parallel to each other. These rails are provided as an adjustable support for the cutter units 25 and 26 which are directly secured to the rails by housings 64 and 65. These housings are so held as to permit them to be adjusted in relation to each other. A suitable bracket extends downwardly from beneath the rails 62 and 63 and is formed with a threaded bore through which the shaft 24 extends. As particularly disclosed in Fig. 1 of the drawings, this shaft has two threads cut upon it. These threads are wound around the shaft in opposite directions and actuate the carriage 59 through the medium of the shaft bracket to move back and forth across the vertically adjustable frame, comprising side rails 42 and 43 and track members 44 and 45 so that as the running gear travels in a straight line the cutters will travel in centrally crossing zig-zag lines, that is the straight portions of one zig-zag line cross the centers of the straight portions of the other zig-zag line.

The housings 64 and 65 extend vertically and are provided as bearings for cutter shafts 66, the bore through the housings being fitted with anti-friction bushings 67 and 68 which relieve the wear upon the shafts when they are rotated by the bevel gears 69 in mesh with driving gears 70 splined upon the shaft 41. The lower ends of the cutter shafts 66 are threaded to receive a circular cutting disk 71. These disks are supported in a horizontal plane and are preferably formed with a series of cutting teeth 72, although it may be found convenient to use the disks without the teeth. The cutter disks 71, when rotated in the direction indicated by the arrow —a— in Fig. 4, co-act with fixed disks or housing flanges 73. These flanges are also formed with serrations which engage the stalks of the cotton and hold them while being severed by the cutting edges of the disks 71.

In operation, the cutter disks 71 and the housing flanges thereabove are vertically adjusted by regulation of the adjusting screws 50—53 inclusive, until the cutters are disposed a suitable depth beneath the surface of the ground, after which the implement may be drawn forward, as indicated by the arrow —b— in Fig. 5. As the vehicle is drawn, the wheels 15 and 16 will be rotated and will in turn impart motion to the gear train in engagement with the wheel 16. The clutch 37 is then thrown into a locking position. This in turn will cause the shaft 23 to drive the drive shaft 24 and the cutter shaft 41 through the medium of flexible shafts 74 and 75, respectively. The rotation of shaft 24 will cause the carriage 59 and the cutter units 25 and 26 to be advanced back and forth along the tracks 44 and 45, as will be understood. Simultaneous with this motion, the shaft 41 will drive the cutter shafts 66 and these in turn will continuously rotate the cutters in the direction of the arrow —a— in Fig. 4. It will thus be seen that the cutter units will simultaneously operate and will be moved from side to side of the frame as the vehicle advances and will therefore describe parallel centrally crossing zig-zag paths of travel which will cause patches —c— of the cotton plant to remain untouched, as indicated in the diagram disclosed in Fig. 5 of the drawings. It will further be understood that by varying the speed of the shaft 23 in relation to the movement of the wheel 16 the diagonal movement of the cutter units may be changed and the untouched cotton caused to occur at any desired interval along the row.

It is obvious that this machine and its cutters may be adapted for use in other fields of agricultural activity and it will therefore be understood that this invention is not confined to cotton chopping alone, but may be used for chopping beets and performing other similar cutting operations.

It will thus be seen that the agricultural implement here disclosed will operate positively and effectively to thin out cotton or other plants and to allow patches of the growth to remain unmolested at given intervals along the row.

While I have shown the preferred construction of my agricultural implement for use as a cotton or beet chopper as now known to me, it will be understood that various changes in the combination, construction, and arrangement of parts may be made by those skilled in the art without departing from the spirit of my invention.

I claim:

1. An agricultural implement comprising a running gear, a main frame upon the running gear, a transversely reciprocating carriage upon the main frame, a vertical rotating shaft in the carriage, and a cutter upon the lower end of the shaft; so that as the running gear travels in a straight line the cutter will travel in a zig-zag line.

2. An agricultural implement, comprising a frame, a running gear thereunder, a pair of cutter disks alined longitudinally of the main frame and rotatably secured to said frame and supported therebeneath, means for simultaneously rotating said disks, means for vertically adjusting said disks in relation to the ground, and means for moving said disks back and forth across and beneath the frame as the implement progresses.

3. An agricultural implement, comprising a frame, a running gear thereunder, a pair of cutter disks alined longitudinally of the main frame and rotatably secured to said frame and supported therebeneath, means for simultaneously rotating said disks, means for vertically adjusting said disks in relation to the ground, means for moving said disks back and forth across and beneath the frame as the implement progresses, and means whereby said cutter disks may be adjusted in relation to each other.

4. An agricultural implement, comprising a running gear, a frame supported thereupon, an auxiliary frame mounted upon the main frame and extending transversely thereof, a pair of cutter disks alined longitudinally of the main frame and positioned beneath said auxiliary frame, means whereby said cutter disks may be moved across the auxiliary frame as the implement advances, means for rotating said cutter disks continuously, adjustable means for raising and lowering the auxiliary frame and the cutter disks, and means whereby the cutters may be horizontally adjusted in relation to each other.

5. An agricultural implement, comprising a running gear, a frame supported thereupon, an auxiliary frame mounted upon the main frame and extending transversely thereof, a pair of cutter disks alined longitudinally of the main frame and positioned beneath said auxiliary frame, means whereby said cutter disks may be moved across the auxiliary frame as the implement advances, means for rotating said cutter disks continuously, adjustable means for raising and lowering the auxiliary frame and the cutter disks, means whereby the cutters may be horizontally adjusted in relation to each other, and a fixed disk adapted to be secured above each of the cutter disks in a manner to hold the stalks of the material during the cutting operation.

6. An agricultural implement comprising a running gear, a main frame upon the running gear, a transversely reciprocating carriage upon the main frame, two vertical longitudinally alined rotating shafts in the carriage, and cutters upon the lower ends of the shafts; so that as the running gear travels in a straight line the cutters will travel in centrally crossing parallel zig-zag lines.

7. An agricultural implement comprising a running gear, a main frame upon the running gear, an elevator upon the main frame, a transversely reciprocating carriage upon the elevator, a vertical rotating shaft in the carriage, and a cutter upon the lower end of the shaft.

8. An agricultural implement comprising a running gear, a main frame upon the running gear, an elevator upon the main frame, a transversely reciprocating carriage upon the elevator, two vertical longitudinally alined rotating shafts in the carriage, and cutters upon the lower ends of the shafts; so that as the running gear travels in a straight line the cutters will travel in centrally crossing parallel zig-zag lines.

9. An agricultural implement, comprising a running gear, a frame mounted thereupon, cutter heads secured to said frame, means for causing said heads to describe diagonal intersecting paths of travel as the implement advances, means whereby the angular path of travel of the cutter heads may be varied, means whereby the cutter heads may be raised and lowered simultaneously, and means whereby the cutter heads may be simultaneously rotated as they move along their paths of travel.

In testimony whereof I have signed my name to this specification.

J. F. YOUNG.

Copies of this patent may be obtained for five cents each, by addressing the "Commissioner of Patents, Washington, D. C."